United States Patent
Asauchi

(10) Patent No.: US 7,599,247 B2
(45) Date of Patent: Oct. 6, 2009

(54) MEMORY AND METHOD OF WRITING DATA

(75) Inventor: Noboru Asauchi, Yamagata-Mura (JP)

(73) Assignee: Seiko Epson Corporation, Tokyo (JP)

( * ) Notice: Subject to any disclaimer, the term of this patent is extended or adjusted under 35 U.S.C. 154(b) by 64 days.

(21) Appl. No.: 11/622,160

(22) Filed: Jan. 11, 2007

(65) Prior Publication Data

US 2007/0165482 A1 Jul. 19, 2007

(30) Foreign Application Priority Data

Jan. 17, 2006 (JP) ............................. 2006-008651

(51) Int. Cl.
*G11C 11/34* (2006.01)
(52) U.S. Cl. .................. 365/239; 365/185.18
(58) Field of Classification Search ................. 365/239, 365/185.18

See application file for complete search history.

(56) References Cited

U.S. PATENT DOCUMENTS 7,059,700 B2 * 6/2006 Aihara ........................ 347/14
7,499,372 B2 3/2009 Asauchi
2002/0060703 A1 * 5/2002 Tsukada ........................ 347/5
2004/0183845 A1 * 9/2004 Aihara ........................ 347/14
2008/0144382 A1 6/2008 Asauchi

FOREIGN PATENT DOCUMENTS

JP 05-282879 A 10/1993
JP 2001-187455 A 7/2001

* cited by examiner

*Primary Examiner*—Michael T Tran
(74) *Attorney, Agent, or Firm*—Stroock & Stroock & Lavan LLP

(57) ABSTRACT

Semiconductor memory devices 10 are each furnished with a memory array 100 having an EEPROM array 101 and a mask ROM array 102. Identifying information for identifying each semiconductor memory device 10 is stored at the beginning three addresses of the EEPROM array 101. 8-bit data relating to ink level is stored at the ninth address to sixteenth address of the EEPROM array 101. The seventeenth address to the twenty-fourth address of the EEPROM array 101 is provided with a usage history information storage area for storing 8-bit usage history information that is rewriteable under certain conditions.

14 Claims, 11 Drawing Sheets

Fig.2

|   | A0 | A1 | A2 | A3 | A4 | A5 | A6 | A7 |
|---|---|---|---|---|---|---|---|---|
| 1 | 00H | ID | | | | | | 07H |
| 2 | 08H | | | IRI | | | | 0FH |
| 3 | 10H | ←  | | UHI | | | → | 17H |
| 4 | | | | | | | | |
| 5 | | | | | | | | |
| 6 | | | | | | | | |
| 7 | | | | | | | | |
| 8 | | | | | | | | |
| 9 | | | | WPA | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | | | | 7FH |
| 17 | 80H | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | BFH |

Fig.3

| MSB | | | | | | | LSB |
|---|---|---|---|---|---|---|---|
| ID0 | ID1 | ID2 | W/R | OPERATION CODE | | | |
| INK LEVEL INFORMATION | | | | | | | |
| USAGE HISTORY INFORMATION | | | | | | | |

Fig.4

| | | ADDRESS (HEX) | | | | | | | |
|---|---|---|---|---|---|---|---|---|---|
| | | ←MSB | | | | | | LSB→ | |
| | | USAGE HISTORY INFORMATION STORAGE AREA UHI | | | | | | | |
| | | 10 | 11 | 12 | 13 | 14 | 15 | 16 | 17 |
| A | EXISTING DATA | 0 | 1 | 0 | 0 | 0 | 0 | 0 | 0 | WRITABLE |
| | WRITE DATA | 1 | 0 | 0 | 0 | 0 | 0 | 0 | 0 | |
| B | EXISTING DATA | 0 | 1 | 0 | 0 | 0 | 0 | 0 | 1 | NON-WRITABLE |
| | WRITE DATA | 0 | 0 | 1 | 0 | 0 | 0 | 0 | 0 | |

Fig.11

| EVENT SEQUENCE | | DATA SEQUENCE WRITTEN | | | | | | | |
|---|---|---|---|---|---|---|---|---|---|
| | | MSB | | | | | | | LSB |
| TIME OF INITIAL USE OF INK CARTRIDGE | C0h | 1 | 1 | 0 | 0 | 0 | 0 | 0 | 0 |
| TIME OF EXECUTING INITIAL CLEANING | E0h | 1 | 1 | 1 | 0 | 0 | 0 | 0 | 0 |
| TIME OF INITIAL SENSOR CHECK | F0h | 1 | 1 | 1 | 1 | 0 | 0 | 0 | 0 |
| WHEN OUT-OF-INK (SENSOR-DETECTED) | F8h | 1 | 1 | 1 | 1 | 1 | 0 | 0 | 0 |
| WHEN OUT-OF-INK (COUNT) | FCh | 1 | 1 | 1 | 1 | 1 | 1 | 0 | 0 |

Fig.12

| | | | | | | | | |
|---|---|---|---|---|---|---|---|---|
| | ID0 | ID1 | ID2 | | | | | |
| MSB | INK LEVEL INFORMATION STORAGE AREA IRI | | | | | | | LSB |
| | Mb | Cb | Clb | Sb | SIE | DIE | — | — |
| | USAGE HISTORY INFORMATION STORAGE AREA UHI | | | | | | | |
| | | | | | | | | |

100

⋮

MEMORY AND METHOD OF WRITING DATA

BACKGROUND OF THE INVENTION

The present invention relates to a sequentially-accessed semiconductor memory device, and to a print recording material receptacle furnished with a sequentially-accessed semiconductor memory device.

Semiconductor memory devices, such as EEPROM for example, that permit only sequential access of data cells in a memory array are well known. Since such semiconductor memory devices are relatively inexpensive, they have come to be used as memory devices for holding information relating to receptacles containing consumable materials, for example. Data relating to usage history is a known example of information relating to receptacles containing consumable materials of this kind. While the nature of usage history data for a receptacle containing consumable material is to be updated in association with usage of the consumable material receptacle, in order for the usage history to be useful, there is a need to prevent to the usage history data from being modified by inadvertent overwriting.

However, data corruption can occur, for example, during transfer of data input to a semiconductor memory device, and in such instances even if the data is rewritten normally to the semiconductor memory device, erroneous information will be recorded to the semiconductor memory device. In the case of sequential access memory, since during accessing of a lower address accessing of data at an upper address is executed as well, in the event that a read/write command is reversed due to some outside disturbance or the like, there is a risk that data will be rewritten to an address that was not intended to be rewritten. Furthermore, since it is in the nature of usage history data to be updated or rewritten, it would be unacceptable to prohibit updating or rewriting.

SUMMARY OF THE INVENTION

The present invention is directed to addressing this problem, and has as an object to improve reliability of data relating to usage history, while also permitting data relating to usage history to be updated or rewritten.

MEANS FOR SOLVING THE PROBLEM

In order to address the above problem, the invention in a first aspect thereof provides a sequential access memory device. The memory device in accordance with the first aspect of the invention comprises a sequentially-accessed nonvolatile memory array, the memory array having a prescribed bit unit usage history data information storage area for the purpose of storing data relating to usage history information; an input/output portion for input and output of data; a decision portion configured to decide whether the value of the prescribed bit unit of write data input via the input/output portion and to be stored in the usage history data information storage area is greater than the value of the prescribed bit unit of the usage history information data currently stored in the usage history data information storage area; write module configured to execute writing in the prescribed bit unit to the memory array; and control module configured to execute, by means of the write module, of writing of the write data to the usage history data information storage area in the memory array, in the event that the value of the write data is greater than the data value of the usage history information data currently stored in the usage history data information storage area.

According to the memory device in accordance with this first aspect of the present invention, in the event that the value of write data is greater than the data value of the usage history information data currently stored in the usage history data information storage area, writing of the write data to the usage history data information storage area in the memory array is executed by the write module, thereby making it possible to improve the reliability of data relating to usage history in a semiconductor memory device, while also permitting data relating to usage history to be updated or rewritten. As a result, unintended rewriting of data relating to usage history can be avoided.

The invention in a second aspect thereof provides a sequential access memory device. The memory device in accordance with the second aspect of the invention comprises a sequentially-accessed nonvolatile memory array, the memory array having a prescribed bit unit usage history data information storage area for the purpose of storing data relating to usage history information; an input/output portion for input and output of data; a decision portion configured to decide whether the value of the prescribed bit unit of write data input via the input/output portion and to be stored in the usage history data information storage area is less than the value of the prescribed bit unit of the usage history information data currently stored in the usage history data information storage area; write module configured to execute writing in the prescribed bit unit to the memory array; and control module configured to execute, by means of the write module, of writing of the write data to the usage history data information storage area in the memory array, in the event that the value of the write data is less than the data value of the usage history information data currently stored in the usage history data information storage area.

According to the memory device in accordance with this second aspect of the present invention, in the event that the value of write data is less than the data value of the usage history information data currently stored in the usage history data information storage area, writing of the write data to the usage history data information storage area in the memory array is executed by the write module, thereby making it possible to improve the reliability of data relating to usage history in a semiconductor memory device, while also permitting data relating to usage history to be updated or rewritten. As a result, unintended rewriting of data relating to usage history can be avoided.

According to the print recording material receptacle in accordance with the third aspect of the invention, the reliability of information relating to usage history may be improved, while also permitting updating or rewriting of information relating to the usage history of the print recording material receptacle.

In the print recording material receptacle in accordance with the third aspect of the invention, the usage history information storage area in the memory device may have stored therein, at a minimum of three consecutive addresses beginning at the start address, the inspection history of the memory device, the usage history of the print recording material receptacle, and out-of-ink information indicating that the print recording material is below a prescribed level. In this case, these three classes of information can be written preferentially.

The invention in a fourth aspect thereof provides a print recording material receptacle containing a print recording material. The print recording material receptacle in accordance with the fourth aspect of the invention comprises the memory device in accordance with the second aspect of the invention, and with a print recording material receptacle portion containing the print recording material.

According to the print recording material receptacle in accordance with the fourth aspect of the invention, reliability of information relating to usage history may be improved, while also permitting updating or rewriting of information relating to the usage history of the print recording material receptacle.

The invention in a fifth aspect thereof provides a printing device on which is detachably installed a print recording material receptacle comprising a memory device; wherein the memory device has stored therein as usage history information relating to the print recording material receptacle information that at a least includes inspection history of the memory device, and usage history, cleaning history, and out-of-ink history of the print recording material receptacle; and records as usage history information therein only data of value greater than the value of existing data. The printing device in accordance with the fifth aspect of the invention comprises event detection module configured to detect the occurrence of an event relating to usage history information; usage history information acquisition module configured to acquire usage history information corresponding to a detected event, the usage history information increasing in value according to a predetermined event occurrence sequence; and transmission module configured to transmit the acquired usage history data to the print recording material receptacle.

According to the printing device in accordance with the fifth aspect of the invention, usage history information that corresponds to detected events and that increases in value according to a predetermined event occurrence sequence, can be recorded to the memory device provided to the print recording material receptacle. Consequently, the reliability of information relating to usage history can be improved, while also permitting updating or rewriting of information relating to the usage history of the print recording material receptacle.

The invention in a sixth aspect thereof provides a printing device on which is detachably installed a print recording material receptacle comprising a memory device, wherein the memory device has stored therein as usage history information relating to the print recording material receptacle information that at a least includes inspection history of the memory device, and usage history, cleaning history, and out-of-ink history of the print recording material receptacle; and records as usage history information therein only data of value greater than the value of existing data. The printing device in accordance with the fifth aspect of the invention comprises event detection module configured to detect the occurrence of an event relating to usage history information; usage history information acquisition module configured to acquire usage history information corresponding to a detected event, the usage history information decreasing in value according to a predetermined event occurrence sequence; and transmission module configured to transmit the acquired usage history data to the print recording material receptacle.

According to the printing device in accordance with the sixth aspect of the invention, usage history information that corresponds to detected events and that increases in value according to a predetermined event occurrence sequence, can be recorded to the memory device provided to the print recording material receptacle. Consequently, the reliability of information relating to usage history can be improved, while also permitting updating or rewriting of information relating to the usage history of the print recording material receptacle.

The printing device in accordance with the fifth or sixth aspect of the invention could also be implemented as a write control method of usage history information for a memory device, a program for the same, of a computer-readable recording medium having a program recorded thereon.

BRIEF DESCRIPTION OF THE DRAWINGS

FIG. 2 is an illustration depicting the format of an internal configuration map of a memory array provided to the semiconductor memory device according to the embodiment of the invention;

FIG. 3 is an illustration depicting the format of a write data sequence for writing to the usage history information storage area in the embodiment;

FIG. 4 is an illustration depicting by way of example a writeable data sequence and a non-writable data sequence for the usage history information storage area in the embodiment;

FIG. 11 is an illustration depicting an exemplary format of a usage history data sequence for writing to the semiconductor memory device according to the embodiment;

FIG. 12 is an illustration depicting an example of storage location assignments of usage history information in the usage history information storage area UHI of the semiconductor memory device 10 according to the embodiment;

DETAILED DESCRIPTION OF PREFERRED EMBODIMENTS

The memory device, write control method of data to the memory device, and printing device of the present invention will be described hereinbelow on the basis of certain preferred embodiments, making reference to the accompanying drawings.

Configuration of Semiconductor Memory Device

Figure 1:
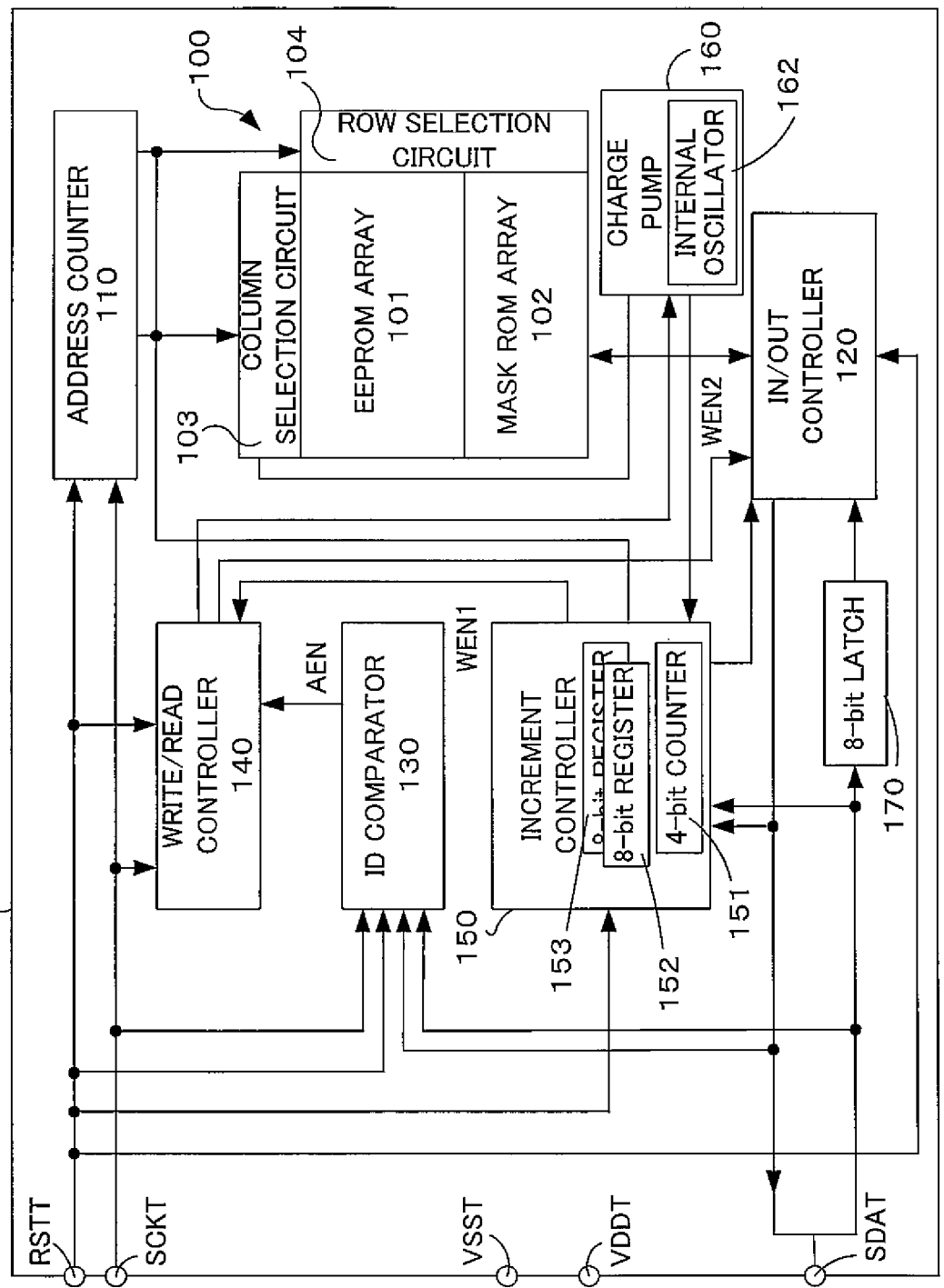
FIG. 1 is a block diagram depicting the internal functional configuration of the semiconductor memory device according to an embodiment of the invention.

The configuration of the semiconductor memory device of the embodiment will be described with reference to FIGS. 1 and 2. FIG. 1 is a block diagram depicting the internal functional configuration of the semiconductor memory device according to an embodiment of the invention. FIG. 2 is an illustration depicting the format of an internal configuration map of a memory array provided to the semiconductor memory device according to the embodiment of the invention.

The semiconductor memory device 10 according to the present embodiment is a memory device of sequential access type that does not require input of address data specifying an access destination from the outside. The semiconductor memory device 10 comprises a memory array 100, an address counter 110, an IN/OUT controller 120, an ID comparator 130, a write/read controller 140, an increment controller 150, a charge pump circuit 160, and an 8-bit latch register 170. These circuits are interconnected by bus-type signal lines.

The semiconductor memory device 10 is equipped with a reset signal terminal RSTT for inputting a reset signal from an external control device; a clock signal terminal SCKT for inputting an external clock signal from an external control device; a reference potential terminal (negative pole power terminal) VSST; a power terminal (positive pole power terminal) VDD for inputting driving voltage from an external control device, for the purpose of driving the semiconductor memory device 10; and a data signal terminal SDAT used for executing input/output of data signals from and to an external control device.

The memory array 100 is equipped with an EEPROM array 101 and a mask ROM array 102. The EEPROM array 101 is a memory area having the characteristics of EEPROM, namely, enabling electronic erasure and reprogramming of data; the EEPROM array 101 used in the present embodiment allows immediate writing of data, without erasing existing data, during data write operations. The mask ROM array 102 is a memory area having the characteristics of mask ROM, namely, that data written to it during the manufacturing process cannot be erased or rewritten.

The EEPROM array 101 and the mask ROM array 102 of the memory array are each furnished with a plurality of data cells (memory cells), of the format depicted in FIG. 2, for storing 1-bit information. In the present embodiment, as shown in FIG. 2, the memory array 100 is provided with prescribed bit units of 8 addresses per line (addresses equivalent to 8 bits of data); for example, the EEPROM array 101 could contain 8 data cells (8 bits) per line and 16 data cells (16 words) per column, allowing it to store 16 words×8 bits (128 bits). The mask ROM array 102 could contain 8 data cells (8 bits) per line and 8 data cells (8 words) per column, allowing it to store 8 words×8 bits (64 bits).

The address map of the memory array 100 will be described with reference to FIG. 2. The memory array 100 in the present embodiment comprises EEPROM array 101 and the mask ROM array 102 discussed earlier. The beginning three addresses (the 3 bits in columns A0-A2 of the first line) of the EEPROM array 101 store identifying information (ID information) for the purpose of identifying individual semiconductor memory devices. Writing to the first line that contains the beginning three bits is prohibited, and rewriting is not possible after shipping from the factory, for example.

In the example of FIG. 2, the ninth address (08H) to sixteenth address (0FH) of the EEPROM array 101 store 8-bit data relating to ink level, for example, remaining ink level data or consumed ink amount data. The seventeenth address (10H) to the twenty-fourth address (17H) of the EEPROM array 101 store 8-bit usage history information which is rewritable under a certain given condition. In the present embodiment, the line composed of this seventeenth address to twenty-fourth address is termed the limited-write line; or the 8 bits of seventeenth address to twenty-fourth address are termed a usage history information storage area UHI of prescribed bit unit.

Depending on the application of the semiconductor memory device 10, the usage history information storage area UHI will store information relating to the usage history of the storage area, or information relating to the usage history of an object furnished with the semiconductor memory device 10. In the present embodiment, an application example of the semiconductor memory device 10 provided to a print recording material receptacle will be described in detail later.

Here, for example, in the event that writing of write data of a larger value than existing data in the usage history information storage area UHI of prescribed bit unit is permitted, the given condition could be that the value of the data to be written is greater than the value of the existing data (increasing data); or in the event that writing of write data of a smaller value than existing data in the usage history information storage area UHI of prescribed bit unit is permitted, the given condition could be that the value of the data to be written is less than the value of the existing data (decreasing data).

An case where writing to the memory array 100 is permitted and a case where writing is not permitted will be described by way of example, making reference to FIGS. 3 and 4. FIG. 3 is an illustration depicting the format of a write data sequence for writing to the usage history information storage area UHI in the present embodiment. FIG. 4 is an illustration depicting by way of example a writeable data sequence and a non-writable data sequence for the usage history information storage area in the embodiment. In FIG. 4, the addresses of the memory array 100 are shown on the horizontal axis, with the most significant bit (MSB) situated at the left edge and the least significant bit (LSB) situated at the right edge. As mentioned previously, addresses 10H-17H correspond to the usage history information storage area UHI.

The data sequence for writing to the memory array 100 has a data sequence that contains identifying information (ID0-2), a read/write command W/R, and an operation code; a data sequence that contains information relating to ink level; and a data sequence that contains usage history data. The usage history data contains, for example, test result data indicating whether the semiconductor memory device 10 has already been tested.

In the first example A, the write data DI (80h) corresponding to the usage history information storage area UHI is greater than the existing data DE (40h), so writing is permitted.

In the second example B, the write data DI (20h) corresponding to the usage history information storage area UHI is less than the existing data DE (40h), so writing is not permitted.

The area of the EEPROM array 101 starting with the twenty-fifth address is a read-only area to which writing is prohibited, and cannot be rewritten after shipping from the factory, for example.

The mask ROM 102 contains information (data) written to it at the time of manufacture of the memory array, and once the memory array has been manufactured, further writing is not possible, even before shipping from the factory.

As described above, the memory array 100 in the present embodiment has a plurality of rows composed of 8-bit units; however, each row is implemented not as an independent data cell sequence, but rather by replicating a single data cell sequence in 8-bit units. Specifically, it is only for convenience that the row containing the ninth bit is referred to as the second byte, and referring to the row containing the seventeenth bit referred to as the third byte. As a result, in order to access a desired address in the memory array 100, a so-called sequential access format involving access sequentially from the beginning is necessary; direct access to a desired address such as in possible in the random access format is not possible here.

Each data cell in the memory array 100 is connected to a word line and a bit (data) line; data is written to a particular data cell by selecting (i.e. applying selection voltage to) its corresponding word line (row) and applying write voltage to its corresponding bit line. Data (a "1" or "0") is read from a data cell by selecting its corresponding word line (row), connecting the corresponding bit line to the IN/OUT controller 120, and detecting whether there is electrical current. In the present embodiment, the prescribed bit unit can be a bit count (data cell count, address count) that is writeable by means of applying write voltage to a single word line.

A column selection circuit 103 connects rows (bit lines) to the IN/OUT controller 120 sequentially in response to the number of external clock pulses counted by the address counter 110. A row selection circuit 104 applies selection voltage to rows (word lines) sequentially in response to the number of external clock pulses counted by the address counter 110. That is, according to semiconductor memory device 10 of the present embodiment, access to the memory array 100 is not executed using address data; rather, access to a desired address is executed exclusively in accordance with the number of external clock pulses counted by the address counter 110.

The address counter 110 is connected to the reset signal terminal RSTT, the clock signal terminal SCKT, the column selection circuit 103, and the row selection circuit 104. The address counter 110 is reset to its initial value by bringing the reset signal input to it via the reset signal terminal RSTT to 0 (or LOW), and after the reset signal goes to 1, will count the number of clock pulses (i.e. increments the count value) in sync with the falling edge of clock pulses input via the external clock signal terminal SCKT. The address counter 110 used in the present embodiment is an 8-bit address counter that stores eight clock pulses corresponding to the data cell count (bit count) of one row of the memory array 100. The initial value can be any value that has been associated with the starting location of the memory array 100; typically, an initial value of 0 is used.

The IN/OUT controller 120 is a circuit for transferring to the memory array 100 write data that been input to the data signal terminal SDAT, or receiving data that has been read out from the memory array 100 and outputting the data to the data signal terminal SDAT. The IN/OUT controller 120 is connected to the data signal terminal SDAT, the reset signal terminal RSTT, the memory array 100, and the write/read controller 140; in accordance with a request from the write/read controller 140, it will control switching of the data transfer direction with respect to the memory array 100, and the data transfer direction (of the signal line connected to the data signal terminal SDAT) with respect to the data signal terminal SDAT. The 8-bit latch register 170 that temporarily stores write data input from the data signal terminal SDAT is connected on the input signal line leading from the data signal terminal SDAT to the IN/OUT controller 120.

The 8-bit latch register 170 holds up to 8 bits of a data sequence (MSB) input from the data signal terminal SDAT via the input signal line; once eight bits have been assembled, the 8-bit data held in the register is written to the EEPROM array 101. The 8-bit latch register 170 is a shift register of so-called FIFO type; once the ninth bit of new input data has been latched, the previously latched first bit data is released.

When the power is turned ON, or during reset, the IN/OUT controller 120 sets the data transfer direction with respect to the memory array 100 to the read direction, and prohibits data input to the data signal terminal SDAT, by means of bringing the input signal line between the 8-bit latch register 170 and the IN/OUT controller 120 to high impedance. This state is maintained until a write process request from the write/read controller 140 is input. Consequently, the data of the beginning four bits of the data sequence input via the data signal terminal SDAT after input of a reset signal will not be written to the memory array 100, while the data stored at the beginning four bits of the memory array 100 (the fourth bit of which is don't care) is sent to the ID comparator 130. As a result, the beginning four bits of the memory array 100 have read-only status.

The ID comparator 130 is connected to the clock signal terminal SCKT, the data signal terminal SDAT, and the reset signal terminal RSTT, and decides whether identifying data contained in an input data sequence input via the data signal terminal SDAT matches the identifying data stored in the memory array 100 (EEPROM array 101). To discuss in greater detail, the ID comparator 100 acquires the identifying data, i.e. the beginning three bits of data of the operation code input after input of the reset signal terminal RSTT. The ID comparator 130 has a 3-bit register (not shown) for storing the identifying data contained in the input data sequence, and a 3-bit register (not shown) for storing identifying data of the three most significant bits acquired from the memory array 100 via the IN/OUT controller 120, and compares the values in these two registers to decide whether the identifying data matches. In the event that both sets of identifying data match, the ID comparator 130 sends an access enable signal EN to the write/read controller 140. Once a reset signal RST is input (RST=0 or Low), the ID comparator 130 clears the values in the registers.

The write/read controller 140 is connected to the IN/OUT controller 120, the ID comparator 130, the increment controller 150, the charge pump circuit 160, the clock signal terminal SCKT, the data signal terminal SDAT, and the reset signal terminal RSTT. The write/read controller 140 is a circuit that verifies the write/read control information (the fourth bit of information following the 3-bit ID information) input via the data signal terminal SDAT in sync with the fourth clock signal subsequent to input of the reset signal RST, and switches the internal operation of the semiconductor memory device 10 to either a write or a read operation. Specifically, if an access enable signal AEN from the ID comparator 130 and a write enable signal WEN1 from the increment controller WEN1 are input, the write/read controller 140 will parse the acquired write/read command. If the command is a write command, the write/read controller 140 will switch the data transfer direction of the bus signal line to the write direction with respect to the IN/OUT controller 120, send a write enable signal WEN2 permitting the write operation, and request the charge pump circuit 160 to generate write voltage.

In the present embodiment, in the event that the write data DI written to the usage history information storage area UHI is data having the characteristic of increasing (incrementing) in value, a decision will be made as to whether the write data DI is a greater value than the existing data DE already stored in the usage history information storage area UHI; or in the event that the write data DI written to the usage history information storage area UHI is data having the characteristic of decreasing (decrementing) in value, a decision will be made as to whether the write data DI is a smaller value than the existing data DE already stored in the usage history information storage area UHI, thereby reducing or preventing data corruption or erroneous input of write data DI. This function is provided in the former case by means of the increment controller, or in the latter case by means of a decrement controller.

The increment controller 150 is connected via signal lines to the reset signal terminal RSTT, the write/read controller 140, and the charge pump circuit 160. The increment controller 150 has an internal 4-bit counter 151 and 8-bit internal registers 152, 153. The increment controller 150 decides whether the write data DI for writing to the usage history information storage area UHI has a greater value than the existing data DE already stored in the usage history information storage area UHI, as well as executing a decision as to whether data written to the EEPROM array 101 has been written correctly (verification, checking).

Concomitantly with the timing of latching of the write data DI in the 8-bit latch register 170, the increment controller 150 reads the existing data DE from the usage history information storage area UHI of the EEPROM array 101, and stores it in the internal 8-bit register 152. The increment controller 150 then compares, in 1-bit units, the read out existing data DE with the write data DI input to the 8-bit latch register 170, and decides whether the write data DI is data of greater value than the existing data DE. In order to allow writing of multiple types of usage history data, in preferred practice the input write data will be stored starting from the MSB, in the order in which the data is to be written (priority).

In the event that the write data DI is data of greater value than the existing data DE, the increment controller 150 outputs a write enable signal WEN1 to the write/read controller 140. In the event that the usage history information storage area UHI spans multiple rows, the increment controller 150 will output a write enable signal WEN1 only in the event that the write data DI in the entire usage history information storage area UHI is data of greater value than the existing data DE.

After writing the write data, the increment controller 150 checks whether the data has been written correctly, and in the event that the data has not been written correctly, restores to the memory array 100 the existing data DE which has been stored in the 8-bit internal register 152 provided internally to the controller. During the check of the write data, the 4-bit counter 151 provided to the increment controller 150, operating from a write standby state at an 8-bit lag with respect to the external clock signal, receives an internal clock signal from an internal oscillator 162 provided to the charge pump circuit 160, and begins to count up. The count value counted up by the 4-bit counter 151 is input to the column selection circuit 103 and the row selection circuit 104, and the existing data DE which has just been written is read out.

As described above, the charge pump circuit 160 is a circuit that, on the basis of a request signal from the write/read controller 140, presents the write voltage needed to write the data tot the EEPROM array, to the selected bit line via the column selection circuit 103. The charge pump circuit 160 comprises an internal oscillator 162 for generating the operating frequency needed during the voltage boost, and generates the required write voltage by boosting the voltage obtained via the positive pole power terminal VDDT.

Read Process

Figure 5:
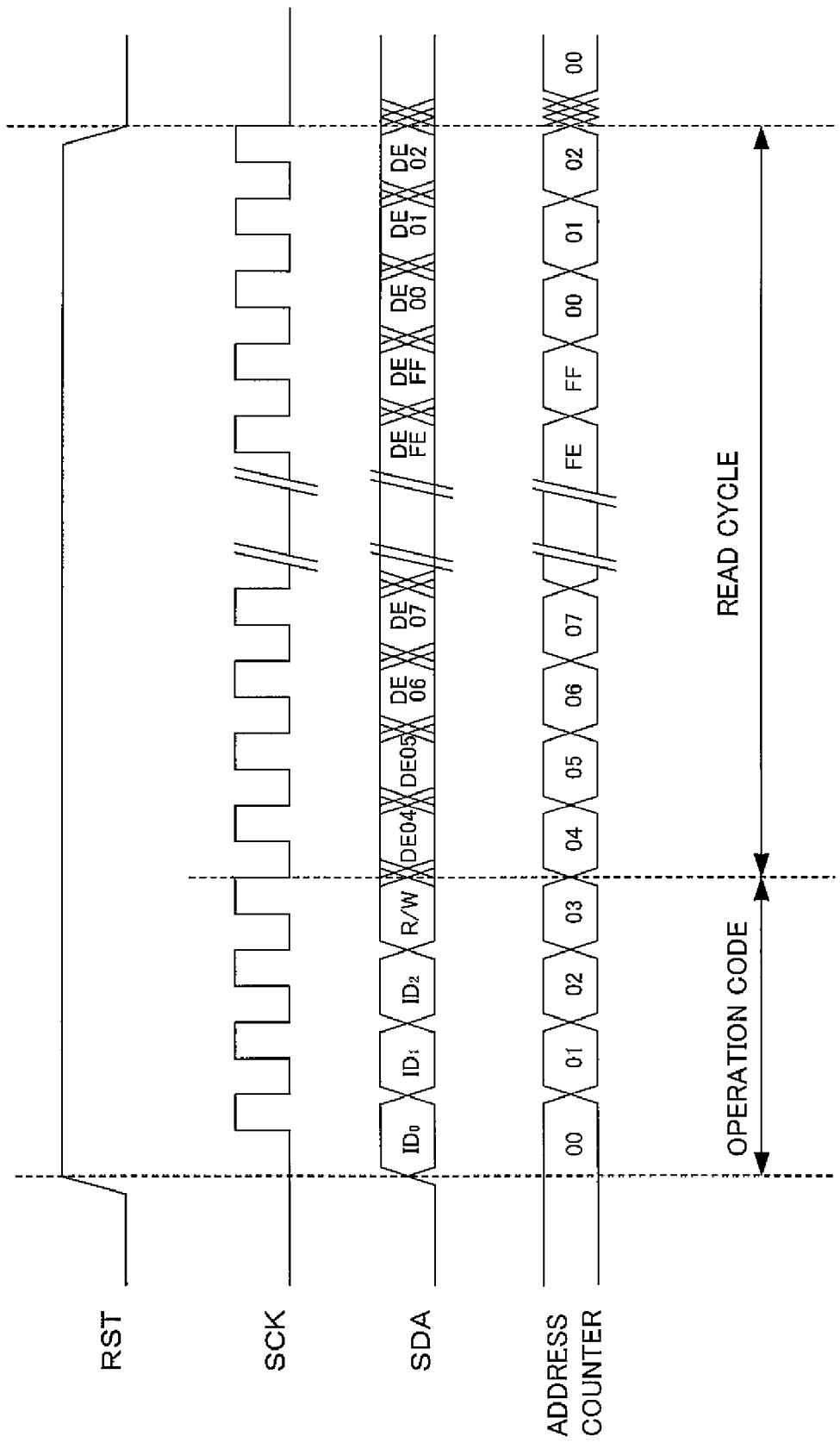
FIG. 5 is a timing chart showing temporal relationships among a reset signal RST, an external clock signal SCK, a data signal SDA, and an address counter value during execution of a read operation.

The read operation in the semiconductor memory device 10 in accordance with the present embodiment will be described with reference to FIG. 5. FIG. 5 is a timing chart showing temporal relationships among the reset signal RST, the external clock signal SCK, the data signal SDA, and the address counter value during execution of a read operation.

Before proceeding to description of the read operation, a process for verifying identifying information and for verifying the read/write command on the basis of the operation code shall be described. When the reset state (RST=0 or Low) is canceled (RST=1 or Hi), a data signal SDA containing a 4-bit operation code is input in sync with the external clock signal SCK, to the data signal terminal SDAT by a host computer, not shown. As shown in FIG. 5, the operation code includes identifying information ID0, ID1, ID2 on the three lead bits, and a command bit (W/R) for determining whether the required operation is a write or read, on the fourth bit from the beginning. Comparison of the identifying information is executed in the following manner.

The ID comparator 130, acting in sync with the rising edge of the three clock signals which follow switching of the reset signal RST from Low to Hi, acquires data input to the data signal terminal SDAT, i.e. the 3-bit identifying information, and stores it in a first 3-bit register. At the same time, the ID comparator 130 acquires data from address in the memory array 100 which are specified by the counter values 00, 01, 02 of the address counter 110, i.e. the identifying information stored in the memory array 100, stores it in a second 3-bit register.

The ID comparator 130 then decides whether the identifying information stored in the first and second registers matches, and in the event that the identifying information does not match, by means of the IN/OUT controller 120 maintains a state of high impedance on the input signal line between the 8-bit latch register 170 and the IN/OUT controller 120. If on the other hand the identifying information stored in the first and second registers matches, the ID comparator 130 outputs an access enable signal AEN to the write/read controller 140. Having received the access enable signal AEN, the write/read controller 140, acting in sync with the rising edge of the fourth clock signal after switching of the reset signal RST from Low to Hi, acquires the command bit sent out over the bus signal line, and determines whether it is a write command. In the event that the write/read controller 140 determines that the acquired command bit is not a write command, it will output a read command to the IN/OUT controller 120.

Having received the read command, the IN/OUT controller 120 changes the direction of data transfer with respect to the memory array 100 to the read direction, and enables data transfer. Since the address counter 110 counts up in sync with the falling edge of the clock signal SCK, subsequent to input of the operation code, the count value in the address counter 110 will be 04, and existing data DE stored at address 04H of the memory array 100 will be read out. The existing data DE stored in the memory array is output sequentially to the data signal terminal SDAT via the IN/OUT controller 120 in sync with the falling edge of the clock signal SCK, and the output existing data DE is held for an interval until the next falling edge of the clock signal SCK. When the clock signal SCK falls, the count value in the address counter 110 is incremented by 1, as a result of which the existing data DE stored at the next address (data cell) in the memory array 100 is now output to the data signal terminal SDAT. This operation is repeated in sync with the clock signal SCK, until reaching the desired address. That is, since the semiconductor memory device 10 of the present embodiment is a memory device of sequential access type, the host computer must issue clock pulses corresponding in number to the desired address for reading or writing, and increment the count value of the address counter 110 to the count value corresponding to the specific address. As a result, existing data DE is read out sequentially from addresses specified by the counter value in the address counter 110, which is incremented in sync with the clock signal SCK.

The memory array 100 of the semiconductor memory device 10 according to the present embodiment only has addresses from 00H to BFH; however, the address counter 110 executes count-up to the address FFH. Addresses C0H to FFH constitute a pseudo region for which no corresponding addresses exist in the memory array 100; during the interval of access to the pseudo region, a value of "0" is output to the data signal terminal SDAT. Once the address counter 110 has counted up to the address FFH, the address returns to the address 00H. After completion of the read operation, a 0 or LOW reset signal RST is input by the host computer, and the semiconductor memory device 10 receives the operation code and assumes the wait state.

When a reset signal RST (=0 or LOW) is input, the address counter 110, the IN/OUT controller 120, the ID comparator 130, the write/read controller 140, and the increment controller 150 are initialized.

Write Process

Figure 6:
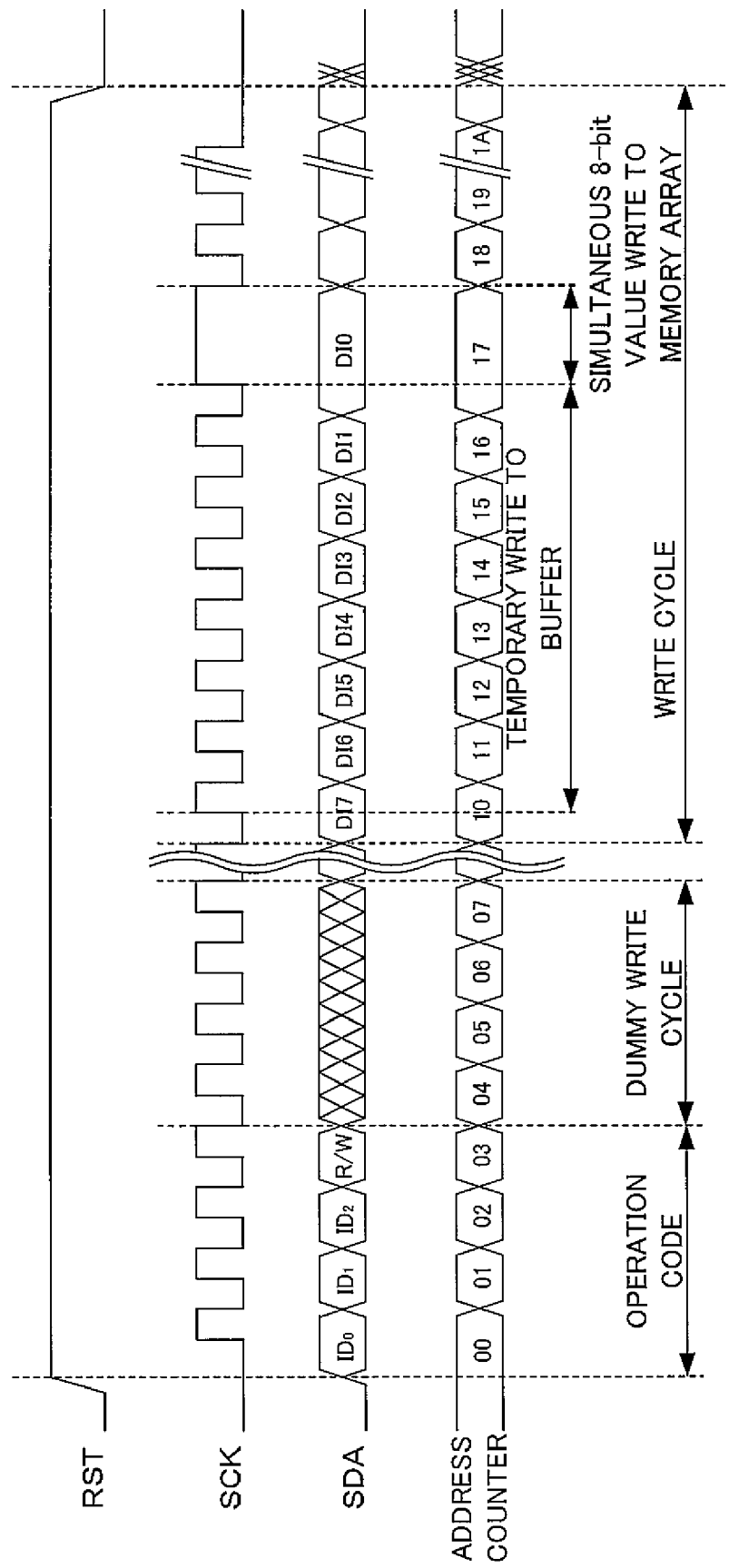
FIG. 6 is a timing chart showing temporal relationships among a reset signal RST, an external clock signal SCK, a data signal SDA, and an address counter value during execution of a write operation.

The write operation in the semiconductor memory device 10 in accordance with the present embodiment will be described with reference to FIG. 6. FIG. 6 is a timing chart showing temporal relationships among the reset signal RST, the external clock signal SCK, the data signal SDA, and the address counter value during execution of a write operation. In the semiconductor memory device 10 in accordance with the present embodiment, write operations are executed in line units (8-bit units), i.e., prescribed bit units (8-address units).

After the ID comparator 130 discussed above has verified that the identifying information matches, in the event that the acquired command bit is a write command and a write enable signal WEN1 has been received from the increment controller 150, the write/read controller 140 will output a write enable signal WEN2 to the IN/OUT controller 120.

As shown in FIG. 6, after the operation code has been input, four clock signals are input as dummy write clock signals to the clock signal terminal SCKT, and the system assumes the write standby state. Since the address counter 110 counts up in sync with the falling edge of the clock signal SCK, subsequent to the write standby state the count value of the address counter 110 will be 08, so the data will be written starting from address 08H of the memory array 100.

In the present embodiment, write data (usage history data) of 8-bit length is written to the memory array 100 containing 8 bits per row. During the write process, 8-bit data starting from the most significant bit (MSB) of the write data DI is sequentially latched in the 8-bit latch register 170, in sync with the rising edge of the clock signal SCK. Until the point in time that a write enable signal WEN2 is output to the IN/OUT controller 120, existing data at addresses following the eighth address of the memory array 100 is sequentially output over the data output signal line (data signal terminal SDA), in sync with the falling edge of the clock signal SCK. The existing data DE output over the data output signal line is then input to the increment controller 150, and together with the write data DI which has been latched in the 8-bit latch register 170, is used in the increment controller 150 to decide whether the write data DI has a greater value than the existing data DE, as will be discussed later. This decision process is executed after the rise of the clock signal SCK (=1 or Hi) in the eighth cycle subsequent to the write standby state.

Having received the write enable command WEN2, the IN/OUT controller 120 changes the direction of data transfer with respect to the memory array 100 to the write direction, and cancels the high impedance setting of the signal line between the 8-bit latch register 170 and the IN/OUT controller, enabling data transfer. As a result, the values (0's or 1's) of the write data DI are transferred to the bit lines of the memory array 100. After the rise of the clock signal SCK (=1 or Hi) in the eighth cycle subsequent to the write standby state, the write/read controller 140 requests the charge pump circuit 160 to generate write voltage; the generated write voltage is applied to the bit lines selected by the column selection circuit 103 (in the present embodiment, all of the bit lines), and as a result the 8-bit data "1's" and "0's" stored in the 8-bit latch register 170 are written all at once to the usage history information storage area UHI.

In the event that the write data is 16-bit data, in sync with the fall of the clock signal SCK in the eighth cycle, the count value of the address counter 110 will be incremented by 1, and the write data DI (second byte of data) for writing to the next addresses (the equivalent of eight addresses) is acquired.

In the present embodiment, during the clock-Low interval after the fall of the clock signal SCK in the eighth cycle, a verification process is executed to verify whether the existing data DE that was just written matches the write data DI that was used in the write operation. Specifically, during the clock-Low interval, a count value for the purpose of specifying addresses for the 8-bit existing data DE that was just written is output to the column selection circuit 103 and the row selection circuit 104 by the 4-bit counter 151 provided to the increment controller 150. As a result, the 8-bit existing data DE that was just written is output is output from the IN/OUT controller 120, and via the IN/OUT controller 120 is stored in the 8-bit internal register 153 provided to the increment controller 150. The increment controller 150 then checks whether the 8-bit existing data DE stored in the 8-bit internal register 153 matches the 8-bit write data stored in the 8-bit latch register 170.

In the present embodiment, since the write data DI is data of 8-bit length, and the usage history information storage area UHI is one row (8 addresses*1), writing of the write data DI will be complete once the above process has been executed one time. After completing writing of the write data DI, a reset signal (=0 or LOW) is input to the reset signal terminal RSTT from the host computer, the memory device receives the operation code and assumes the wait state, and the write process terminates.

In the event that the write data DI is data of 16-bit length, and the usage history information storage area UHI is two rows (8 addresses*2), writing of the write data DI will be complete once the above process has been executed twice.

Write data sent from the host computer has values (0's or 1's) identical to those of the data currently stored in the memory array 100, with the exception of data corresponding to addresses intended to be rewritten. That is, data at addresses not intended to be overwritten in the memory array 100 are overwritten with identical values.

When a reset signal (=0 or LOW) is input, the address counter 110, the IN/OUT controller 120, the ID comparator 130, the write/read controller 140, and the increment controller 150 are initialized.

Increment Check Process

Figure 7:
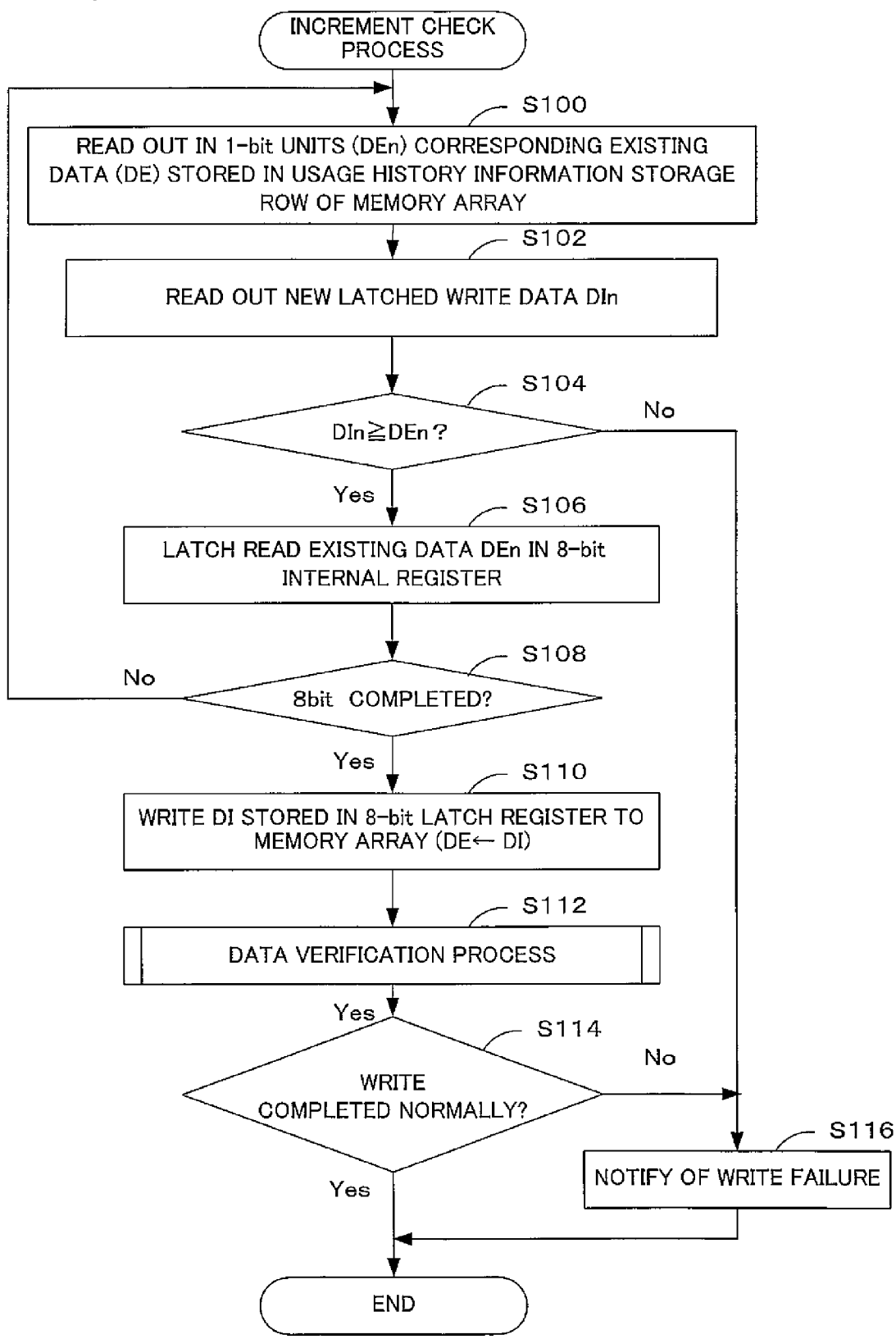
FIG. 7 is a flowchart depicting the processing routine of an increment check process in a write process executed by the semiconductor memory device according to the embodiment.
Figure 8:
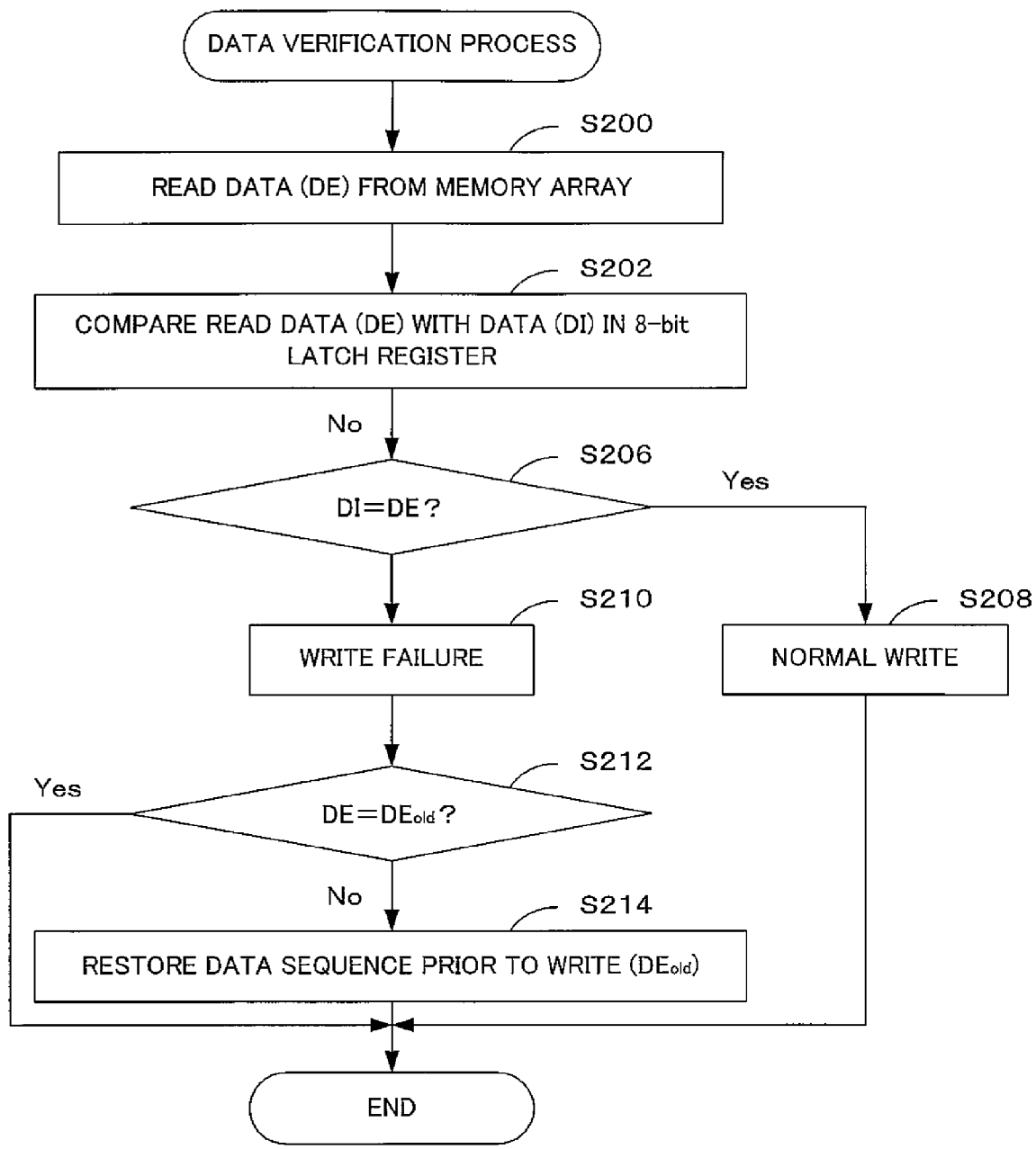
FIG. 8 is a flowchart depicting the processing routine of a data verification process in a write process executed by the semiconductor memory device according to the embodiment.

The increment check process and data verification process executed by the semiconductor memory device 10 according to the present embodiment shall be described making reference to FIGS. 7 and 8. FIG. 7 is a flowchart depicting the processing routine of an increment check process in the write process executed by the semiconductor memory device 10 according to the embodiment. FIG. 8 is a flowchart depicting the processing routine of a data verification process in the write process executed by the semiconductor memory device 10 according to the embodiment.

Once the write process is initiated, concomitantly with the timing of latching of the write data DI of 8-bit (1 byte) length in the 8-bit latch register 170, the increment controller 150 reads out in 1-bit units the corresponding existing data DE stored in the usage history information storage area UHI (Step S100). Subsequently, each one bit of the existing data DE making up the 8-bit existing data DE stored in the usage history information storage area UHI is designated as existing data DEn (n=1 to 8). Each one bit of the write data DI making up the 8-bit write data DI stored in the usage history information storage area UHI is designated as write data DIn (n=1 to 8).

The increment controller 150 reads out in 1-bit units the corresponding existing data DE stored in the usage history information storage area UHI, which as been output from the IN/OUT controller 120 in sync with the falling edge of the clock signal SCK after the final bit of write data DI8 of the first byte has been latched in the 8-bit latch register 170.

The increment controller 150 then reads out the 1-bit write data latched in the 8-bit latch register 170 (Step S102) at this timing. In the present embodiment, the write data DI is input to the semiconductor memory device 10 in sequence starting from the most significant bit (MSB), and write data is sequentially latched in the 8-bit latch register 170 by the MSB.

The increment controller 150 then determines whether the value of the write data DIn read out from the 8-bit latch register 170 is equal to or greater than the value of the existing data DEn read out from the usage history information storage area UHI of the memory array 100, i.e. whether DIn≧DEn (Step S104). In the event that the increment controller 150 determines that DIn<DEn (Step S104: No), the processing routing terminates. That is, writing of the write data DI is not executed.

In the event that the increment controller 150 determines that DIn≧DEn (Step S106: Yes), the existing data DEn read out from the usage history information storage area UHI is placed in the 8-bit internal register 152 (Step S106).

The increment controller 150 then determines whether comparisons of the 8-bit existing data DEn stored in the usage history information storage area UHI with the 8-bit write data DIn stored in the 8-bit latch register 170 have been completed (Step S108), and in the event that the comparisons have not been completed (Step S108: No), repeatedly executes the processes of Steps S100-S106.

In the event that the increment controller 150 determines that comparisons of the 8-bit existing data DEn stored in the usage history information storage area UHI with the 8-bit write data DIn stored in the 8-bit latch register 170 have been completed (Step S108: Yes), the write data DIn stored in the 8-bit latch register 170 becomes the new existing data DE. To discuss in greater detail, as mentioned previously, the increment controller 150 does not directly execute writing of write data DI to the memory array 100; rather, a write enable signal WEN1 enabling the write data DI stored in the 8-bit latch register 170 to be written to the usage history information storage area UHI of the memory array 100 is output to the write/read controller 140, and having received the write enable signal WEN1, the write/read controller 140 executes writing.

The increment controller 150 executes the data verification process (Step S112), and in the event that writing has completed normally (Step S114: Yes), terminates the write process. On the other hand, in the event that the increment controller 150 executes the data verification process (Step S112) and determines that writing did not complete normally (Step S114: No), notification of a write failure is issued (Step S116) and the write process is terminated.

The data verification process will be described making reference to FIG. 8. The increment controller 150 reads the existing data DE that was just written, from the usage history information storage area UHI of the memory array 100 (Step S200) and compares it with the write data DI stored in the 8-bit latch register 170 (Step S210). Specifically, during the clock-Low interval after completion of writing of the first byte, the increment controller 150, using the internal clock signal from the internal oscillator 162 provided to the charge pump circuit 160, causes the 4-bit counter 151 to count up. The increment controller 150 inputs the count value of the 4-bit counter 151 to the column selection circuit 103 and the row selection circuit 104, and the 8-bit existing data DE1 that was just written from the usage history information storage area UHI of the memory array is output sequentially according to the address via the IN/OUT controller 120, and is latched in the 8-bit internal register 153. That is, the internal clock signal is output at a lag of 8 bits (8 clock pulses) from the write standby state.

The increment controller 150 determines whether the existing data DE latched in the 8-bit internal register 153 matches the write data DI latched in the 8-bit latch register 170 and used for writing to the usage history information storage area UHI (Step S204). In the event that the existing data DE read from the usage history information storage area UHI and stored in the 8-bit internal register 153 matches the write data DI stored in the 8-bit latch register 170 (Step S204: Yes), the increment controller 150 decides that writing completed normally (Step S206), and terminates the processing routine.

In the event that the existing data DE read from the usage history information storage area UHI and stored in the 8-bit internal register 153 does not match the write data DI stored in the 8-bit latch register 170 (Step S204: No), the increment controller 150 decides that writing did not complete normally, i.e. there was a write failure (Step S208). The increment controller 150 then determines whether the existing data DE read from the usage history information storage area UHI and stored in the 8-bit internal register 153 matches the existing data $DE_{old}$ that prior to the write process was stored in the 8-bit internal register 152 (Step S210), and in the event it determines that DE=$DE_{old}$ (Step S210: Yes), terminates the processing routine. On the other hand, in the event that the increment controller 150 has determined that DE≠$DE_{old}$ (Step S210: No), it restores to the usage history information storage area UHI of the memory cell 100 the existing data $DE_{old}$ that prior to the write process was stored in the 8-bit internal register 152 (Step S212), and terminates the processing routine. In case where 16-bit data is employed as the usage history data, in the event that a write failure is determined for the initial 8 bits, the write process to the next (second) usage history information storage area will not be executed for the following 8 bits.

The restore process is accomplished by executing an additional write cycle following the write process cycle to the usage history information storage area UHI. Specifically, in the additional write cycle, the existing data $DE_{old}$ that was stored in the 8-bit latch is input to the IN/OUT controller 120, and a write process to the usage history information storage area UHI is executed in the same manner as for data input via the data signal terminal SDAT. As a result, the data in the usage history information storage area UHI is restored to the values prior to execution of the write process.

Application Example of the Semiconductor Memory Device 10

Figure 9:
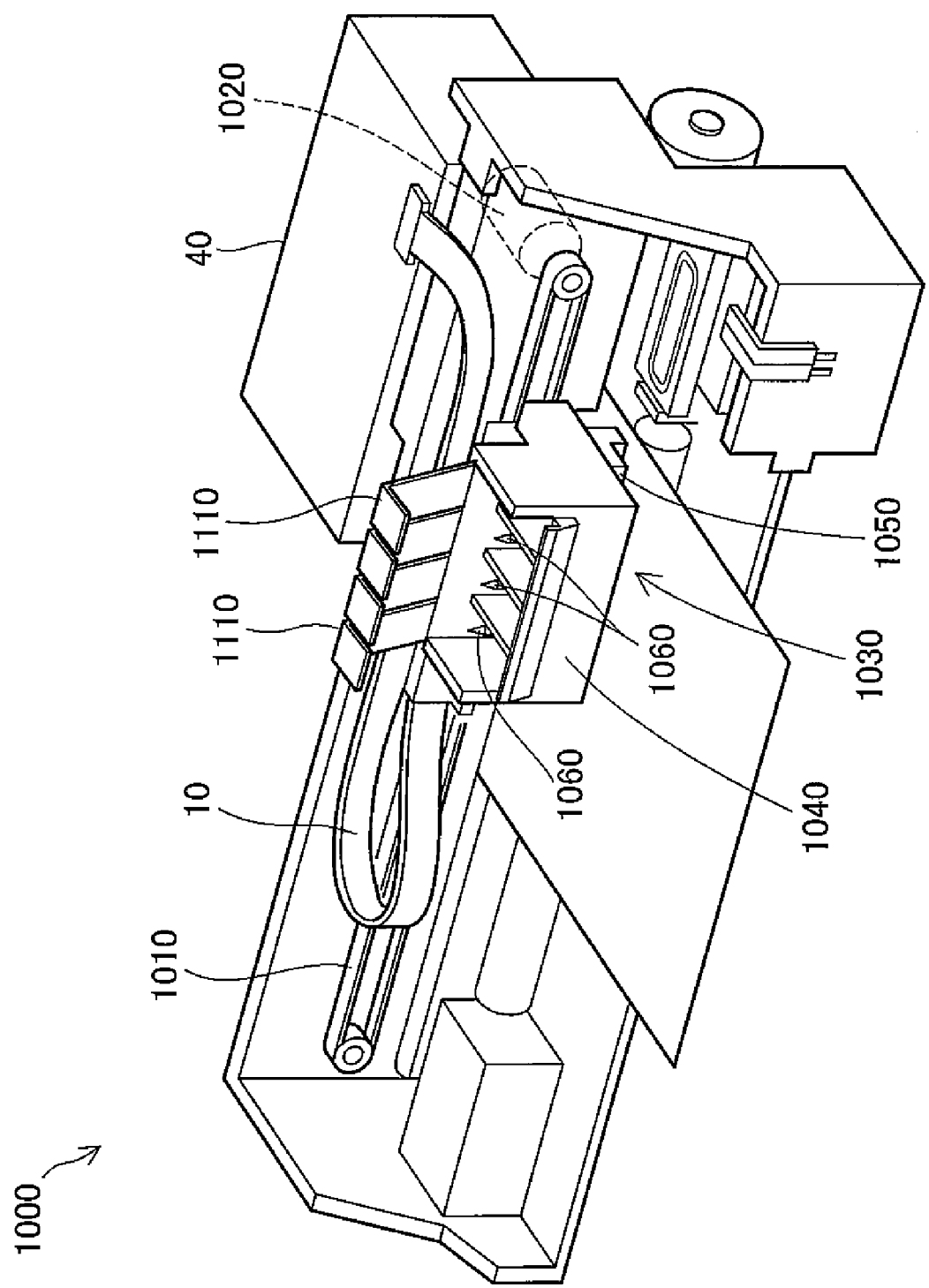
FIG. 9 is an illustration depicting schematically the printing device according to the embodiment.
Figure 10:
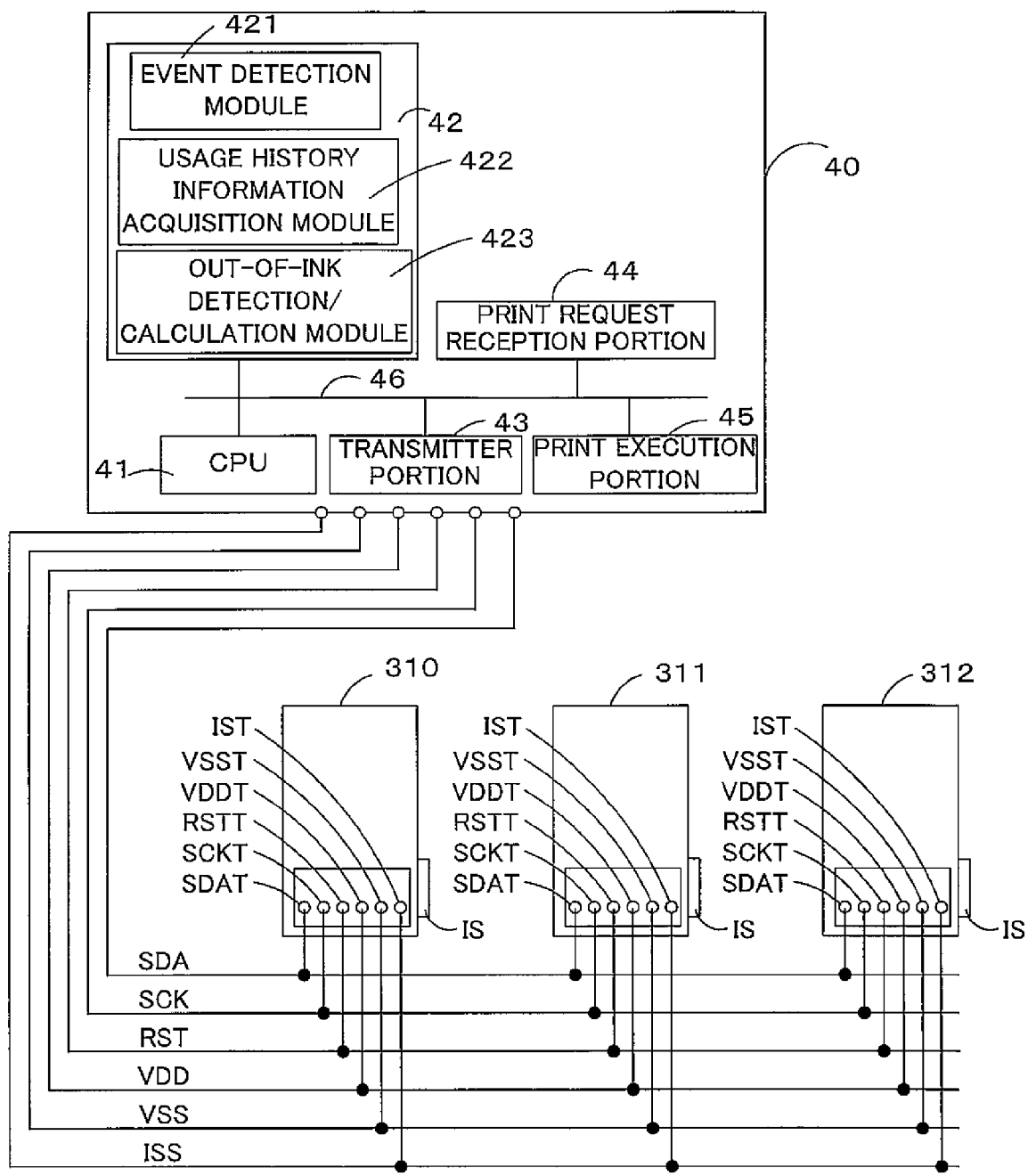
FIG. 10 is an illustration depicting in functional block format the internal configuration of a control circuit provided to the printing device according to the embodiment, and connections between the control circuit and various semiconductor memory devices.
Figure 13:
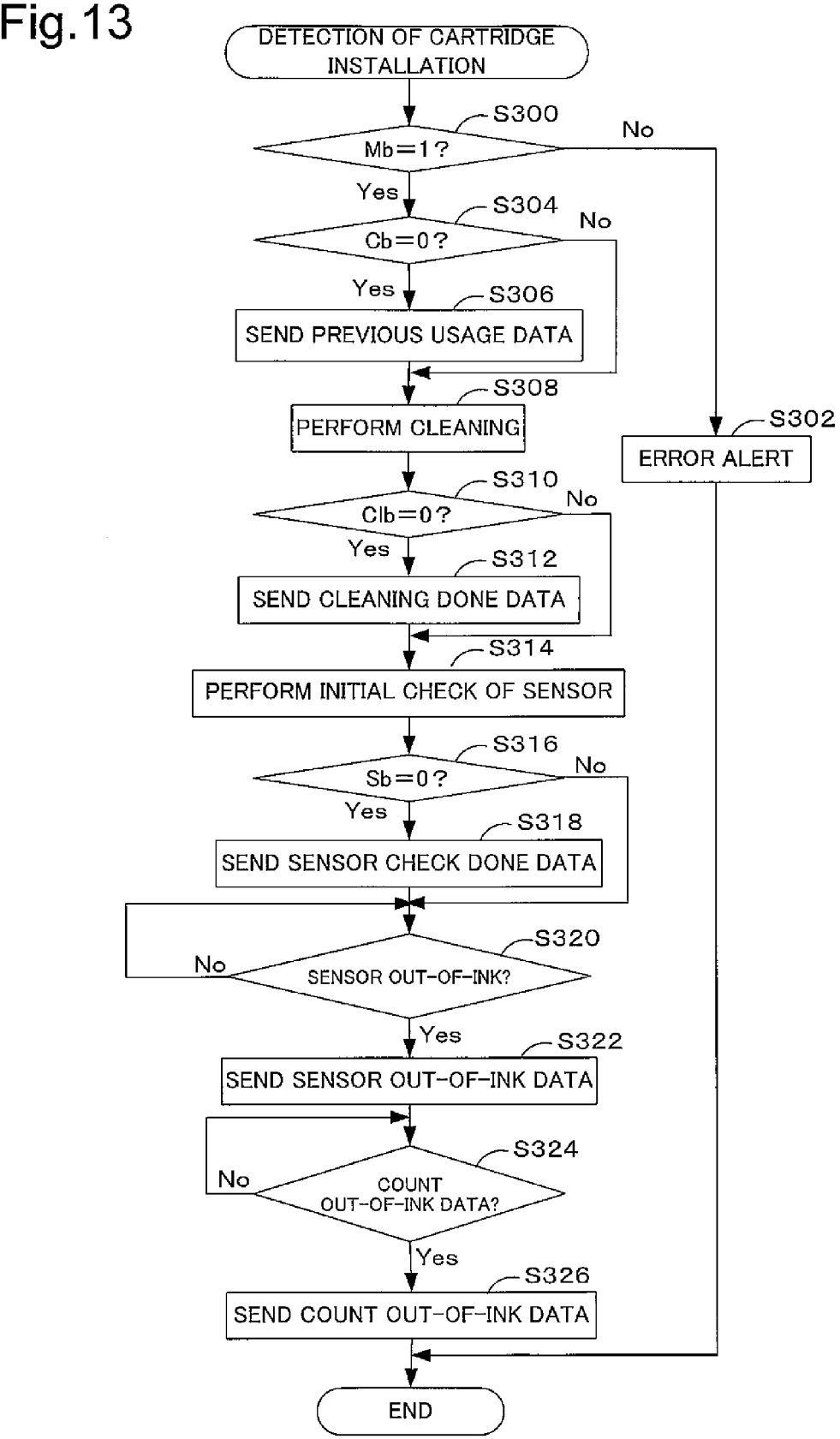
FIG. 13 is a flowchart depicting the processing routine in a usage history data write control process executed on the semiconductor memory device by the printing device according to the embodiment.
Figure 14:
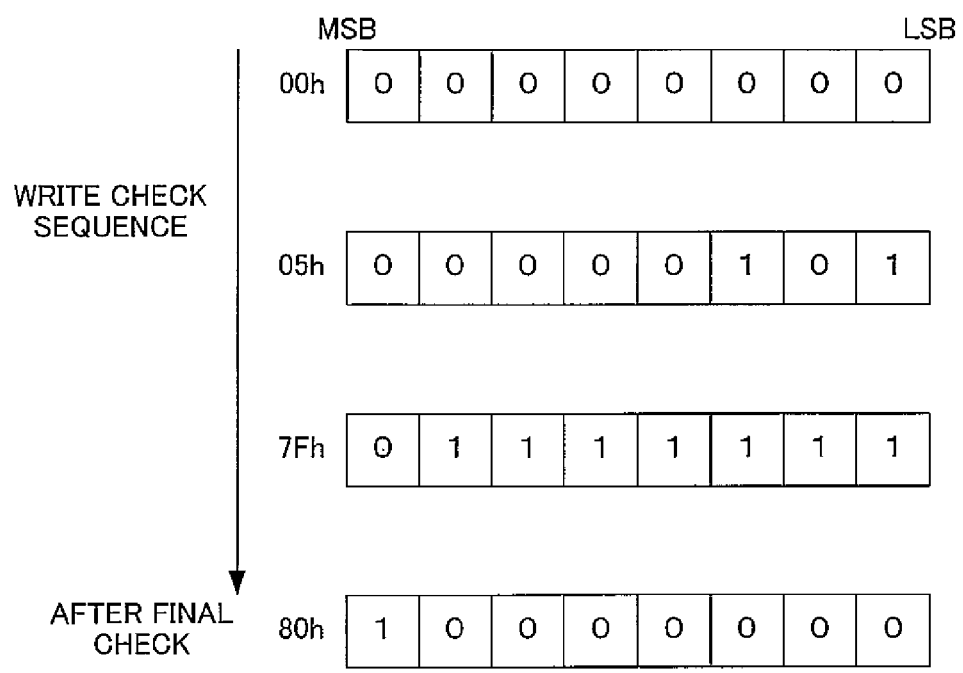
FIG. 14 is an illustration depicting an exemplary write test procedure on the semiconductor memory device according to the embodiment.

An application example of the semiconductor memory device 10 will be described making reference to FIGS. 9 to 13. In the example hereinbelow, the semiconductor memory device 10 according to the present embodiment is installed in a print recording material receptacle (ink cartridge), and is adapted to receive write or read requests from a printing device in which the print recording material receptacle has been detachably installed. FIG. 9 is an illustration depicting schematically the printing device 1000 according to the present embodiment. FIG. 10 is an illustration depicting in functional block format the internal configuration of a control circuit 40 provided to the printing device 1000 according to the present embodiment, and connections between the control circuit and various semiconductor memory devices. FIG. 11 is an illustration depicting an exemplary format of a usage history data sequence for writing to the semiconductor memory device 10 according to the embodiment. FIG. 12 is an illustration depicting an example of storage location assignments of usage history information in the usage history information storage area UHI of the semiconductor memory device 10 according to the present embodiment. FIG. 13 is a flowchart depicting the processing routine in a usage history data write control process executed on the semiconductor memory device 10 by the printing device 1000 according to the present embodiment. FIG. 14 is an illustration depicting an exemplary write test procedure on the semiconductor memory device 10 according to the present embodiment.

The printing device 1000 used in the present embodiment has a sub-scan feed mechanism, a main scan feed mechanism, and a head drive mechanism. The sub-scan feed mechanism employs a paper feed roller powered by a paper feed motor, not shown, to advance the printing paper P in the sub-scanning direction. The main scan feed mechanism, using the drive power from a carriage motor 1020, reciprocates in the main scanning direction a carriage 1030 which is connected to a drive belt 1010. The head drive mechanism drives a print head 1050 provided on the carriage 1030, and executes ejection of ink and formation of dots. The printing device 1000 is additionally provided with a control circuit 40. The control circuit 40 is connected to the carriage 1030 via a flexible cable 1080.

The carriage 1030 comprises a holder 1040, the print head 1050, and a carriage circuit. The holder 1040, designed to accommodate installation of multiple ink cartridges, is located on the upper face of the print head 1050. In the example shown in FIG. 9, the holder 1040 is adapted for installation of four ink cartridges, for example, four ink cartridges of the types black, yellow, magenta, and cyan, installed one at a time. Four reclosable covers, one for each installed ink cartridge, are attached to the holder 1040. Ink supply needles 1060 for delivering ink from the ink cartridges to the print head are also arranged on the upper face of the print head 1050.

The semiconductor memory device 10 according to the present embodiment is provided to receptacles for containing a consumable material, for example, ink cartridges 310, 311, 312 containing inks as print recording material. Each of the ink cartridges 310, 311, 312 comprises an out-of-ink sensor IS that employs a piezo element oscillated by application of voltage. The out-of-ink sensor IS is positioned facing the small flow path formed in the ink cartridge 310, 311, 312; the oscillated out-of-ink sensor IS outputs a voltage that includes a characteristic frequency component of the area around the small flow path that varies depending on whether ink is present. Consequently, by comparing the frequency component included in the output voltage of the out-of-ink sensor IS with the frequency component in the out-of-ink condition or non-out-of-ink condition, it is possible to determine whether the ink cartridge is in the out-of-ink condition. In the present embodiment, out-of-ink refers not to an ink level of zero, but rather to a nearly out-of-ink condition in which a prescribed level of ink remains.

Once the positioned ink cartridges 310, 311, 312 have been installed in the printing device 1000, they are bus-connected to the control circuit 40 of the printing device. Specifically, the data signal line SDA, the clock signal line SCK, the reset signal line RST, the positive pole power line VDD, the negative pole power line VSS, and the increment detection line ISS from the control circuit 40 are connected to the semiconductor memory device 10 provided to each of the ink cartridges 310, 311, 312. In this application example, information relating to the level of ink (remaining ink level or amount of ink consumed), and usage history information relating to the ink cartridge are stored in the semiconductor memory device 10.

The control circuit 40 comprises a central processing unit (CPU) 41, a memory 42, a transmitter portion 43, a print request reception portion 44, and a print execution portion 45. In the memory 42 are stored an event detection module 421 for detecting the occurrence of events that should be written to the usage history information data for the semiconductor memory device 10; a usage history information acquisition module 422 for acquiring usage history information; and an out-of-ink detection/calculation module 423 for sensor detection of an out-of-ink condition on the basis of the sensor signal from the out-of-ink sensor IS, or count calculation of an out-of-ink condition by means of counting the number of ejected ink dots.

The CPU 41 executes each of the modules stored in the memory 42, detects events, and performs writing of usage history information to the semiconductor memory device 10. Events for which usage history information should be written could include, for example, installation of the ink cartridge; cleaning of the print head 1050; testing of the out-of-ink sensor; detection of an out-of-ink condition by the out-of-ink sensor; or detection of an out-of-ink condition by counting the number of dots. The event detection module 421 will detect the occurrence of such events.

The usage history information acquisition module 422 acquires usage history information corresponding to detected events. As shown in FIG. 12, the usage history information storage area UHI in the semiconductor memory device 10 according to the present embodiment is provided with storage bits for items of usage history information according to the order in which events occur (priority sequence). Also, only writing of data of greater value than existing data (increasing data) is permitted. Referring to FIG. 12, there are assigned, in order from the MSB in the usage history information storage area UHI, a Check Done information storage bit Mb, a previous usage information storage bit Cb, a Cleaning Done information storage bit Clb, an Initial Sensor Check Done information storage bit Sb, a sensor out-of-ink information storage bit SIE, and a dot out-of-ink information storage bit DIE.

The usage history information storage area UHI in the semiconductor memory device 10 according to the present embodiment permits writing of data of greater value than existing data (increasing data) only. Consequently, as shown in FIG. 11, usage history information will have value depending on the order in which the event has occurred (priority sequence). For example, in the event that installation of the ink cartridge has been detected, usage history information (usage history data) having a value of C0h will be used; in the event that installation cleaning of the print head 1050 has been detected, usage history information having a value of E0h will be used; in the event that checking of the out-of-ink sensor has been detected, usage history information having a value of F0h will be used; in the event that sensor out-of-ink condition has been detected, usage history information having a value of F8h will be used; and in the event that count out-of-ink condition has been detected, usage history information having a value of FCh will be used. For all of this usage history information, values increase according to the processing order in the printing device 1000.

The transmitter portion 43 transmits to the semiconductor memory device 10 usage history data that was acquired together with the write command. The print request reception portion 44 receives a print request (print instruction) from the user, and sends print data to the print execution portion 45. The print data can be, for example, data specifying amounts of ink to be ejected from the print head 1060 corresponding to each ink color on a raster-by-raster basis, or data including image data and control commands for controlling the print head 1050. The print execution portion 45 controls the print head 1050 on the basis of the received print data, and forms an image on the printing medium, for example, paper.

The write control process of usage history information to the semiconductor memory device 10 executed by the printing device 1000 according to the present embodiment will be described with reference to FIG. 13. The following description will take the ink cartridge 310 by way of example. This processing routine is executed one the ink cartridge 310 has been installed on the carriage 1030.

The CPU 41 of the printing device 1000 decides whether the check is done for the semiconductor memory device 10 of the ink cartridge 310 (Step S300). Specifically, the CPU 41 determines whether the Check Done information storage bit Mb assigned to the MSB of the usage history information storage area UHI has a value of 1. As shown in FIG. 14, in the present embodiment, before the ink cartridge 310 is installed a write test is performed on the 8 bits (8 addresses) making up the usage history information storage area UHI, and during the final check data of 80h is written. Consequently, if the MSB (Check Done information storage bit Mb) of the usage history information storage area UHI has a value of 1, it can be determined that testing of the semiconductor memory device 10 has been completed.

In the event that the Check Done information storage bit Mb does not have a value of 1, i.e. it is 0 or not readable (S301: No), through the user interface the CPU 41 will alert the user of a memory error (S302), and terminate the routine. The user interface could be, for example, a display panel or indicator lamp provided to the printing device 1000, or a status screen displayed by the printer driver, on a display monitor connected to a PC.

In the event that the Check Done information storage bit Mb=1 (Step S302: Yes), the CPU 41 determines whether the ink cartridge 310 is an ink cartridge 310 having a history of previous installation in the printing device 1000 (Step S304). As mentioned previously, previous usage information is stored on the previous usage information storage bit Cb which is the second bit from the MSB in the usage history information storage area UHI; the CPU 41 determines whether the previous usage information storage bit Cb=0.

In the event that the previous usage information storage bit Cb=1 (Step S304: No), the CPU 41 moves on to Step S308.

On the other hand, in the event that the previous usage information storage bit Cb=0 (Step S304: Yes), the CPU 41 sends the previous usage data described earlier to the semiconductor memory device 10 (Step S306), and sets the previous usage information storage bit Cb to 1.

The CPU 41 then executes a cleaning process on the print head 1050 (Step S308). The cleaning process is executed, for example, by carrying out a suctioning process on the ink ejection nozzles provided to the print head 1050. After executing the cleaning process, the CPU 41 determines whether history of a completed cleaning process has been recorded to the semiconductor memory device 10 (Step S310). As mentioned previously, Cleaning Done information is stored in the Cleaning Done information storage bit CIb which is third bit from the MSB in the usage history information storage area UHI; the CPU 41 determines whether the Cleaning Done information storage bit CIb=0.

In the event that the Cleaning Done information storage bit CIb=1 (Step S310: No), the CPU 41 moves on to Step S314. On the other hand, in the event that the Cleaning Done information storage bit CIb=0 (Step S310: Yes), the CPU 41 sends the Cleaning Done data described earlier to the semiconductor memory device 10 (Step S312), and sets the Cleaning Done information storage bit Cb to 1.

The CPU 41 then executes an initial check of the out-of-ink sensor IS (Step S314). The initial check of the out-of-ink sensor IS is carried out, for example, by applying to the out-of-ink sensor IS a drive voltage that would be applied where the amount of ink is at least equal to a prescribed amount; and determining whether there is obtained thereby a sensor signal having the oscillation frequency component that would be obtained where the amount of ink is at least equal to a prescribed amount. Since the ink cartridge 310 is full in the initial state, if the out-of-ink sensor IS is functioning normally, there should be obtained a sensor signal having the oscillation frequency component that would be obtained where the amount of ink at least equal to a prescribed amount. After the initial check of the out-of-ink sensor IS has been performed, the CPU 41 determines whether an Initial Sensor Check Done history has been recorded to the semiconductor memory device 10 (Step S316). As mentioned previously, Initial Sensor Check Done information is stored in the Initial Sensor Check Done information storage bit Sb which is fourth bit from the MSB in the usage history information storage area UHI; the CPU 41 determines whether the Initial Sensor Check Done information storage bit Sb=0.

In the event that the Initial Sensor Check Done information storage bit Sb=1 (Step S316: No), the CPU 41 moves on to Step S320. On the other hand, in the event that the Initial Sensor Check Done information storage bit Sb=0 (Step S316: Yes), the CPU 41 sends the Initial Sensor Check Done data described earlier to the semiconductor memory device 10 (Step S318), and sets the Initial Sensor Check Done information storage bit Sb to 1.

The CPU 41 then waits for an out-of-ink condition to be detected by the out-of-ink sensor IS (Step S320: No), and once an out-of-ink condition has been detected by the out-of-ink sensor IS (Step S320: Yes), sends the sensor out-of-ink data described previously to the semiconductor memory device 10 (Step S322), and sets the sensor out-of-ink information storage bit SIE to 1. The sensor out-of-ink information storage bit is the fifth bit from the MSB in the usage history information storage area UHI, for example.

The CPU 41 waits for determination of an out-of-ink condition by means of dot count (Step S324: No), and once an out-of-ink condition has been detected by means of dot count (Step S325: Yes), sends the dot out-of-ink data described previously to the semiconductor memory device 10 (Step S326), sets the dot out-of-ink information storage bit DIE to 1, and terminates the routine. The dot out-of-ink information storage bit is the sixth bit from the MSB in the usage history information storage area UHI, for example.

As discussed above, according to the semiconductor memory device 10 in accordance with the present embodiment, only usage history data DI of greater value than the existing usage history data DE is written to the usage history information storage area UHI. Consequently, where the ink cartridge 310 comprises the semiconductor memory device 10 and usage history data that increases in value in order of the occurrence of events in association with use of the ink cartridge 310 is employed, it becomes possible to improve the update accuracy and reliability accuracy of usage history relating to the ink cartridge 310. Specifically, in the event that due to noise the usage history data DI sent from the printing device 1000 has been modified to a value smaller than the preceding value, or in the event that a value smaller than the preceding value has been sent in error by the printing device 1000, the value will not be written to the usage history information storage area UHI. As a result, various processes and maintenance can be performed with a high degree of reliability based on usage history information, on the ink cartridge 310 provided to the semiconductor memory device 10.

The printing device 1000 executes controls of various kinds based on the usage history of the ink cartridge 310. For example, in the event that it is not possible to verify the write test completion history of the semiconductor memory device 10 provided to the ink cartridge 310, by issuing an error alert without executing the printing process, it is possible to avoid using the ink cartridge 310 under conditions in which usage history cannot be written to it. Moreover, by making decisions as to whether allow the printing process to be executed based on out-of-ink history, i.e. by monitoring the occurrence of misfire by the ink head of an ink jet printer based on the usage history information, it is possible to reduce or prevent damage to the ink head by misfire, with greater accuracy.

Other Embodiments (1) In the preceding embodiment, a determination is made as to whether the semiconductor memory device 10 has been checked when the ink cartridge 310 is installed in the printing device 1000; additionally, it would be acceptable to make a determination as to whether the semiconductor memory device 10 has been checked when a print request has been issued. In this case, by making the determination during execution of the printing process as well, it is possible to avoid various problems during the printing process which could be caused by the use of usage history information stored in a semiconductor memory device 10 that has not been checked.

For example, by designing the CPU 41 so that the CPU 41 will not request the print execution portion 45 to perform the requested printing process in the event that a printing process is requested again despite an alert to the effect that a memory error has occurred in the semiconductor memory device 10 provided to the ink cartridge 310, or in the event that a printing process is requested in a configuration that lacks a memory error alert function, it is possible to reduce or avoid unanticipated problems in the printing process.

(2) An arrangement whereby, at the time of a print request, the out-of-ink information is looked up, and in the event that either item of out-of-ink information, or the sensor out-of-ink information, or both items of out-of-ink information show a "1", the printing process is not executed would be acceptable as well. The semiconductor memory device 10 according to the present embodiment is provided with other ink level information, but as discussed previously, there is a risk that data corruption or write errors will occur. In contrast to this, the usage history information storage area UHI in the present embodiment allows writing of data (information) of increasing value only. Consequently, even if an error should occur in the ink level information after an out-of-ink condition has been determined by referring to the out-of-ink information, it will nevertheless be possible to correctly discern the out-of-ink condition of the ink cartridge 310, and to reduce or prevent damage to the print head 1050 caused by misfire.

(3) In the embodiment described above, the usage history information storage area UHI is stored at an upper address of the memory array 100. However, it would be possible instead for the usage history information storage area UHI to be assigned to a consecutive 8-bit area from the uppermost address, or to be assigned to a lower address. In the case where the usage history information storage area UHI has been assigned to the uppermost address, rewriting of the usage history information can be executed with precedence over other information.

The history information to be stored in the usage history information storage area UHI is not limited to the history information mentioned in the embodiment described above. Furthermore, the order of storage of the items of usage history information in the usage history information storage area UHI herein is merely exemplary, and may of course be modified in the event that the priority sequence (sequence of occurrence) of events is modified. For example, instead of one bit, several bits could be assigned to the Cleaning Done information indicating that the cleaning process has been completed. In this case, cleaning process execution cycles could be recorded up to a prescribed number of cycles.

Where the storage order of the sensor out-of-ink information storage bit SIE and the dot out-of-ink information storage bit DIE is the order taught in the preceding embodiment, a configuration such as the following would be possible. At the point in time that an out-of-ink condition is detected by the out-of-ink sensor, the printer detects that the remaining ink level is very low, and sets the value of the sensor out-of-ink information storage bit SIE to 1. Here, there is still some remaining ink, for example, in the ink passage downstream from the out-of-ink sensor in the direction of ink movement, which can be used for printing. The volume of this remaining ink which can still be used is predetermined by the shape of the ink passage. The printer permits printing operations from this time forward; using the dot out-of-ink calculation module, calculates the dot ink usage amount going forward from the point that the out-of-ink condition was detected by the out-of-ink sensor; and at the point in time that this amount reaches a predetermined threshold value, decides that the dot out-of-ink condition has been reached, and sets the dot out-of-ink information storage bit DIE to 1.

On the other hand, where the storage order of the sensor out-of-ink information storage bit SIE and the dot out-of-ink information storage bit DIE is the reverse of the order taught above, a configuration such as the following would be possible. By means of the dot out-of-ink calculation module, the printer calculates the dot ink usage amount; and at the point in time that the dot out-of-ink condition is reached sets the dot out-of-ink information storage bit DIE to 1, and by means of the calculation detects that the dot out-of-ink condition has been reached. The dot out-of-ink calculation is carried out, for example, by multiplying the number of dots used in printing, by the volume of ink per dot; in actual practice, however, there is variability in the amount of ink used. Accordingly, at the point in time that a dot out-of-ink condition is reached, the printer continues to enable printing operations while detecting that there is little remaining ink; and at the subsequent point in time that a sensor out-of-ink condition is detected by the sensor, sets the sensor out-of-ink information storage bit SIE to 1, and detects that the sensor out-of-ink condition has been reached.

Figure 15:
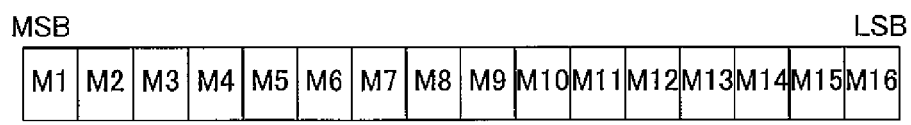
FIG. 15 is an illustration depicting an exemplary 16-bit usage history information data sequence in another embodiment.

(4) In the preceding embodiment, 8-bit data was used as the usage history information; however, as shown in FIG. 15, it would be acceptable to use 16-bit data, or to instead use a 24-bit length or 36-bit length. Implementation is possible in the same manner for data having data length which is a multiple of the bit length of one row of the memory array 100, and the effects of doing so will be the same. In this case, it will be possible to record more usage history information. FIG. 15 is an illustration depicting an exemplary 16-bit usage history information data sequence in another embodiment.

(5) In the preceding embodiment, writing to the usage history information storage area UHI is permitted in the event that the write data DI has a greater value than the existing data DE; however, it would also be acceptable to permit writing to the usage history information storage area UHI in the event that the write data DI and the existing data DE are equal as well. In this case, at a minimum, usage history information stored in the memory array 100 will not be erased retroactively, thus reducing or preventing problems associated with erasing usage history. In this case, the existing data DE will be overwritten by write data of identical values.

(6) The preceding embodiment described the case where data having the characteristic of increasing in value, i.e. usage history information larger in value in the order in which events occur, is used for the semiconductor memory device 10; however, similar advantages may be obtained with the use of data having the characteristic of decreasing in value, i.e. usage history information smaller in value in the order in which events occur. In this case, the increment controller 150 may be replaced with a decrement controller for determining whether write data DI is date of smaller value than the existing data DE. In this case, data of the value (11111110) will be written to the usage history information storage area UHI of the semiconductor memory device 10 installed in the ink cartridge 310. In order to write more usage history information, it is preferable to write usage history information in 1-bit units sequentially, starting from the LSB of the usage history information storage area UHI.

(7) In the preceding embodiment, an ink cartridge was used as an application example, but similar effects can be obtained with a toner cartridge as well. Moreover, similar effects can be obtained in the case of a prepaid card or other medium which stores information equivalent to money.

(8) In the preceding embodiment, the 4-bit counter and the internal oscillator 162 are used in the verification process; however, the verification process could be executed without using these circuits. Specifically, whereas in the preceding embodiment the verification process is executed in 8-bit units using existing data DE latched in the 8-bit internal register 153 and write data DI latched in the 8-bit latch register 170, the process could instead be executed in 1-bit units. In this case, the increment controller 150 will not need to be furnished with the 4-bit counter 151 and the internal oscillator 162.

While the semiconductor memory device, print recording material receptacle, printing device, and write control method to a semiconductor memory device in a printing device in accordance with the present invention have been shown herein through certain preferred embodiments, the embodiments of the invention described above are intended merely to aid understanding of the invention and should not be construed as limiting thereof. Various modifications and improvements to the invention are possible within the spirit and scope thereof as set forth in the appended claims, and these are to be considered as equivalents of the present invention.

The following Japanese patent application as the basis of the priority claim of this application are incorporated in the disclosure hereof by reference: Japanese Patent Application No. 2006-8651 (filing date: Jan. 17, 2006).

What is claimed is:

1. A memory device comprising:
   a nonvolatile memory array, the memory array having a prescribed bit unit of usage history data information storage area for storing data relating to usage history information;
   an input/output portion for input and output of data;
   a decision portion configured to decide whether the value of the write data input via the input/output portion and to be stored in the usage history data information storage area is greater than the value of the usage history information data currently stored in the usage history data information storage area;
   a write module configured to execute writing in the prescribed bit unit to the memory array; and
   a control module configured to execute, by way of the write module, writing of the write data to the usage history data information storage area in the memory array, in the event that the value of the write data is greater than the value of the usage history information data currently stored in the usage history data information storage area.

2. A memory device comprising:
   a nonvolatile memory array, the memory array having a prescribed bit unit of usage history data information storage area for the purpose of storing data relating to usage history information;
   an input/output portion for input and output of data;
   a decision portion configured to decide whether the value of write data input via the input/output portion and to be stored in the usage history data information storage area is less than the value of the usage history information data currently stored in the usage history data information storage area;
   a write module configured to execute writing in the prescribed bit unit to the memory array; and
   a control module configured to execute, by means of the write module, writing of the write data to the usage history data information storage area in the memory array, in the event that the value of the write data is less than the data value of the usage history information data currently stored in the usage history data information storage area.

3. A memory device of claim 1 wherein
   the usage history data information storage area stores usage history information in order of earliest time of usage, starting from higher-order bits.

4. A memory device according to claim 1 or 2 wherein
   the memory array has a plurality of memory cells identified by the addresses and used for the purpose of storing bit data; and the usage history information storage area has the plurality of memory cells, equal in number to the bit count of the usage history information.

5. A memory device of claim 4 wherein
the usage history data information storage area further has a continuous sequence of memory cells beginning from the lead memory cell of the memory array and equal in number to a bit count of the usage history information.

6. A memory device according to claim 1 or 2 wherein
the memory array has the usage history information storage area at an upper address.

7. A memory device of claim 6 wherein
the memory array has the usage history information storage area at upper addresses that include the uppermost address.

8. A print recording material receptacle containing a print recording material, the print recording material receptacle comprising:
the memory device in accordance with claim 1; and
a print recording material receptacle portion containing the print recording material.

9. A print recording material receptacle according to claim 8 wherein
the usage history information storage area in the memory device has stored therein, at a minimum of three consecutive addresses beginning at the start address, the inspection history of the memory device, the usage history of the print recording material receptacle, and out-of-ink information indicating that the print recording material is below a prescribed level.

10. A memory device of claim 2 wherein
the usage history data information storage area stores usage history information in order of earliest time of usage, starting from lower-order bits.

11. A print recording material receptacle containing a print recording material, the print recording material receptacle comprising:
the memory device in accordance with claim 2; and
a print recording material receptacle portion containing the print recording material.

12. A print recording material receptacle according to claim 11 wherein
the usage history data information storage area in the memory device has stored therein, at a minimum of three consecutive addresses up through the end address, the inspection history of the memory device, the usage history of the print recording material receptacle, and out-of-ink information indicating that the print recording material is below a prescribed level.

13. A method of writing write data to a memory device including a nonvolatile memory array, the memory array having a prescribed bit of usage history data information storage area for the purpose of storing data relating to usage history information, comprising the steps of:
determining whether the value of the write data input and to be stored in the usage history data information storage area is greater than the value of the usage history information data currently stored in the usage history data information storage area; and
writing the write data to the usage history data information storage area in the memory array, in the event that the value of the write data is greater than the value of the usage history information data currently stored in the usage history data information storage area.

14. A method of writing write data to a memory device including a nonvolatile memory array, the memory array having a prescribed bit of usage history data information storage area for the purpose of storing data relating to usage history information, comprising the steps of:
determining whether the value of the write data input and to be stored in the usage history data information storage area is less than the value of the usage history information data currently stored in the usage history data information storage area; and
writing the write data to the usage history data information storage area in the memory array, in the event that the value of the write data is less than the data value of the usage history information data currently stored in the usage history data information storage area.

* * * * *